H. S. ROBERTS.
LIGHT DIMMER.
APPLICATION FILED NOV. 13, 1919.

1,417,630.  Patented May 30, 1922

UNITED STATES PATENT OFFICE.

HENRY S. ROBERTS, OF LOS ANGELES, CALIFORNIA.

LIGHT DIMMER.

1,417,630.  Specification of Letters Patent.  Patented May 30, 1922.

Application filed November 13, 1919. Serial No. 337,769.

*To all whom it may concern:*

Be it known that I, HENRY S. ROBERTS, a citizen of the United States, residing at the city of Los Angeles, county of Los Angeles, State of California, have invented new and useful Improvements in Light Dimmers, of which the following is a specification.

My invention relates primarily to a dimmer for the headlights of automobiles but may be used on other lights if desired. In driving automobiles at night when meeting another machine when the machines are equipped with strong lights and reflectors the light rays are thrown into the eyes of the drivers of the approaching machines when at a short distance apart, thereby producing temporarily almost blindness in the drivers of the machines. It is the object of my invention to provide a simple and inexpensive dimmer, which can be placed in any of the standard makes of headlights without any change in their construction, which will prevent the glare of the headlight from reaching the eyes of the driver of an approaching vehicle, and will also permit sufficient light to be shed to illuminate the roadway and make driving safe.

Figure 1:
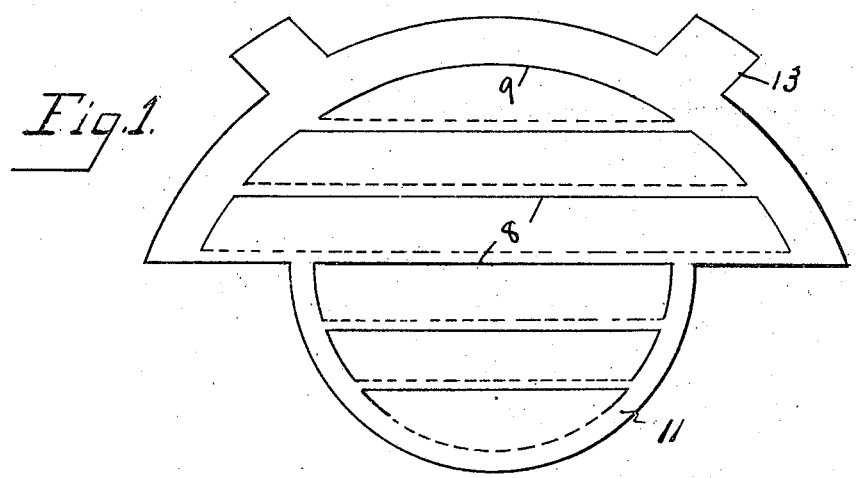
Figure 2:
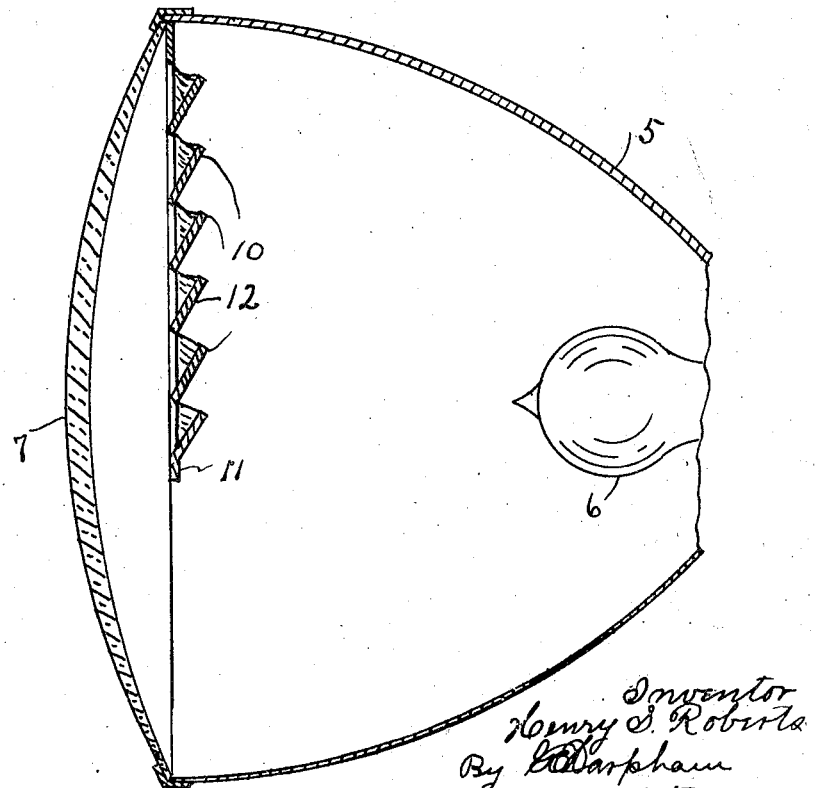

In the drawings forming a part of this application, Fig. 1 is a front view of my dimmer detached and before the same is positioned. Fig. 2 is a vertical central section of the front portion of an automobile headlight with my dimmer positioned therein also in vertical central cross section.

Referring to the drawings 5 is the outer casing, the inner surface of which forms the reflector. 6 the lamp and 7 the lens of an automobile headlight, all of standard construction and of such size as may be desired for the machine on which the same is used. My dimmer is constructed of a sheet of suitable opaque material, preferably of sheet metal and is adapted to fit into the upper part of casing 5 and is slotted by slits 8 which preferably run horizontally when positioned for use alsmost to the outer edge except the upper slit 9 which is curved, and the material along the slits is bent inwardly to lie in a plane angularly disposed to the forwardly projected rays of the lamp when positioned for use and form light deflecting bars 10, best shown in Fig. 2. The upper bar has a curved top.

I have found sheet tin a suitable material. The lower bar has a depending semi-circular portion 11 which lies in front of the lamp when the dimmer is positioned. It is also slotted into bars 12 which are angularly disposed like the other bars. In the upper edge are attaching ears 13 which are bent over the lens to hold the dimmer in the headlight in proper position for use.

I prefer the bars 10 should extend from the upper edge of the casing about one third the distance across the same and that portion 11 should extend to a plane parallel to and passing just below the lamp and should be about half the width of the front of the casing at the point when part 11 joins bars 10. The angularity of bars 10 and 12 is preferably 45° to the forwardly projected rays of light when in use. By this construction a cheap and efficient dimmer is provided which will effectually prevent the glare of an approaching automobile headlight from striking eyes of the driver of a meeting vehicle. By dividing the depending portion into bars all road shadows are avoided.

Having described my invention I claim:—

1. In a dimmer for headlights, comprising a portion located only in the upper part of the lens, and a depending portion located in front of the lamp, and substantially horizontally arranged louvers covering substantially the entire surface of both said portions.

2. An anti-glare attachment for headlights comprising two substantially semicircular portions of different sizes joined at their bases, and louvers covering substantially the entire surface of both portions, the larger portion being adapted to cover the upper part of the lens and the smaller portion to be located in front of the lamp.

In witness that I claim the foregoing I have hereunto subscribed my name this 6th day of November, 1919.

HENRY S. ROBERTS.